May 16, 1961     T. A. HERBERT, JR     2,984,732
APPARATUS AND METHOD FOR BRAZING HONEYCOMB SANDWICH PANELS
Filed May 24, 1957     6 Sheets-Sheet 1

INVENTOR.
T.A. HERBERT JR.
BY George Stell
AGENT

May 16, 1961 T. A. HERBERT, JR 2,984,732
APPARATUS AND METHOD FOR BRAZING HONEYCOMB SANDWICH PANELS
Filed May 24, 1957 6 Sheets-Sheet 3

Fig-3

INVENTOR.
T.A.HERBERT JR.
BY
George Stell
AGENT

United States Patent Office 2,984,732
Patented May 16, 1961

2,984,732
APPARATUS AND METHOD FOR BRAZING HONEYCOMB SANDWICH PANELS

Thomas A. Herbert, Jr., San Diego, Calif., assignor to Rohr Aircraft Corporation, Chula Vista, Calif., a corporation of California Filed May 24, 1957, Ser. No. 661,517

26 Claims. (Cl. 219—78)

This invention relates to a method and apparatus for brazing and more particularly to a method and apparatus for brazing the ends of a metallic cellular core to the opposing faces of two spaced apart metallic skins to produce a honeycomb sandwich panel.

In the construction of metallic honeycomb sandwich panels it is customary to place the skins and core in assembled relationship on a suitable support with a thin layer of brazing material disposed between the ends of the core and the opposing faces of the skins. The support and assembled skins and core are then placed in a suitable container from which air is withdrawn and replaced with an inert gas to prevent oxidation of the metal by the high brazing temperatures, and the entire assembly is then placed in a furnace and heated to a brazing temperature. The heating process is necessarily slow since the container and support must be heated to a brazing temperature as well as the skins and core and upon completion of the heating process a long period is required to cool the container and support sufficiently to permit removal of the completed panel. Also, since the support and container must be constructed to withstand the high brazing temperatures, their cost is relatively high so that the cost of producing metallic sandwich panels in this manner is excessively high due to the length of time required to perform the brazing operation and the costs of the equipment used.

It is, therefore, the principal object of this invention to provide a method and apparatus for brazing metallic honeycomb sandwich panels in which the brazing operation is performed quickly through the use of relatively inexpensive equipment.

A further object is to provide a brazing apparatus wherein the brazing operation is performed in a non-oxidizing atmosphere.

Another object is to provide a method and apparatus for brazing metallic sandwich panels of various shapes and configurations.

A further object is to provide an apparatus for brazing metallic sandwich panels in which the skins and core are supported and firmly held together in assembled relationship during the brazing operation.

Another object is to provide a method and apparatus which is simple, inexpensive and highly efficient.

Another object is to provide an apparatus containing a heating means for performing the brazing operation without the use of a furnace.

These and other objects and advantages will become apparent as the description of the invention proceeds.

For a better understanding of the invention reference is made to the accompanying drawing illustrating a preferred embodiment thereof and in which.

Figure 2:
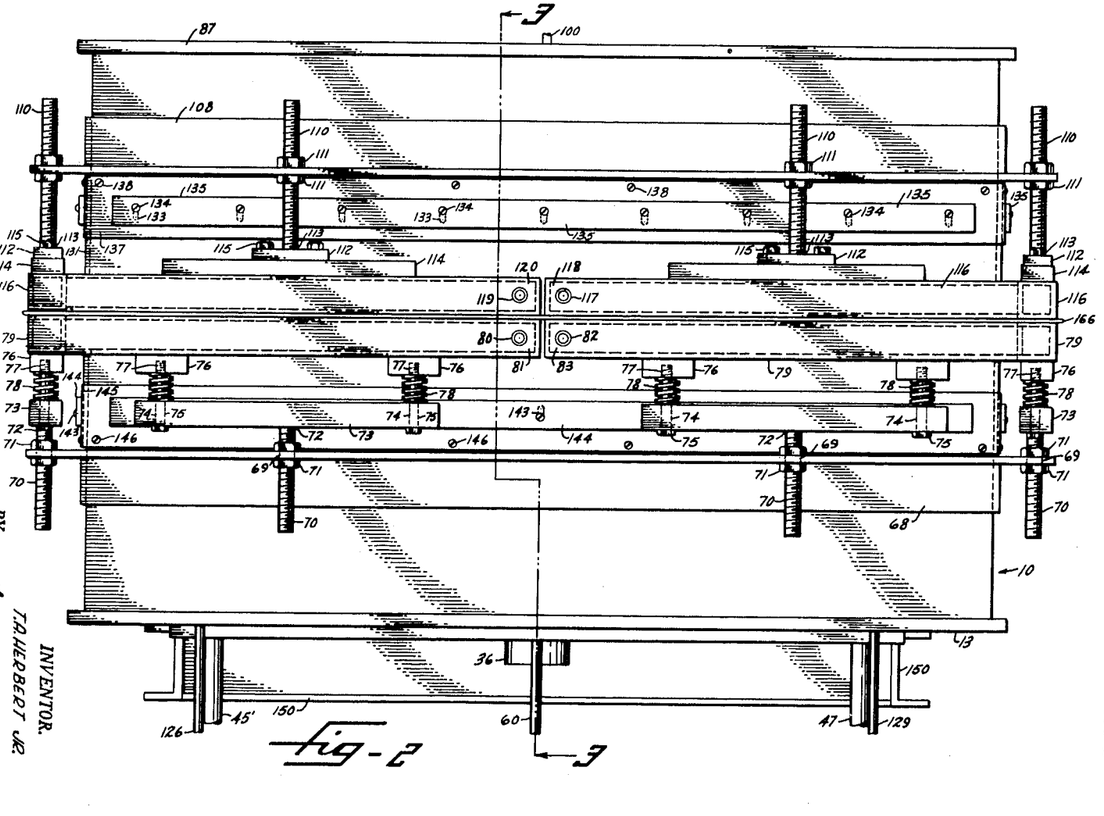
Fig. 2 is an end view of the apparatus.
Figure 3:
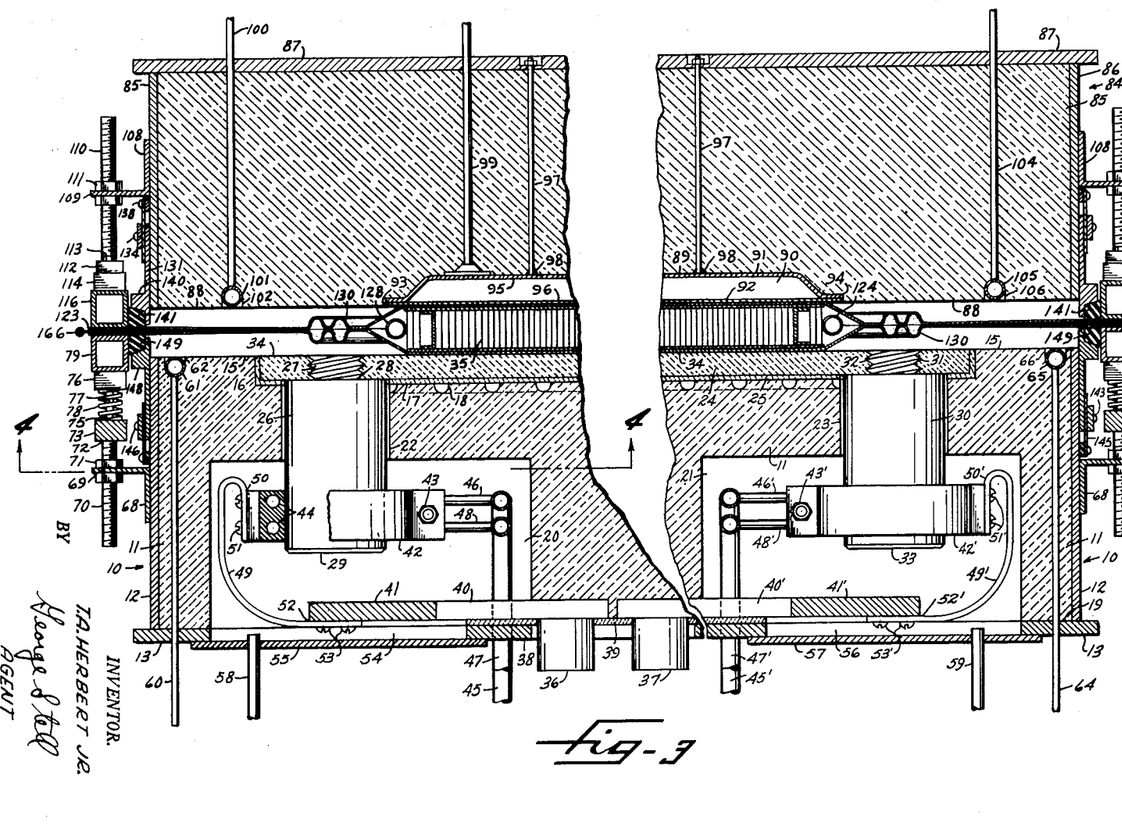
Fig. 3 is a view taken on line 3—3 of Fig. 2 with certain elements used in the brazing process omitted for clarity.
Figure 4:
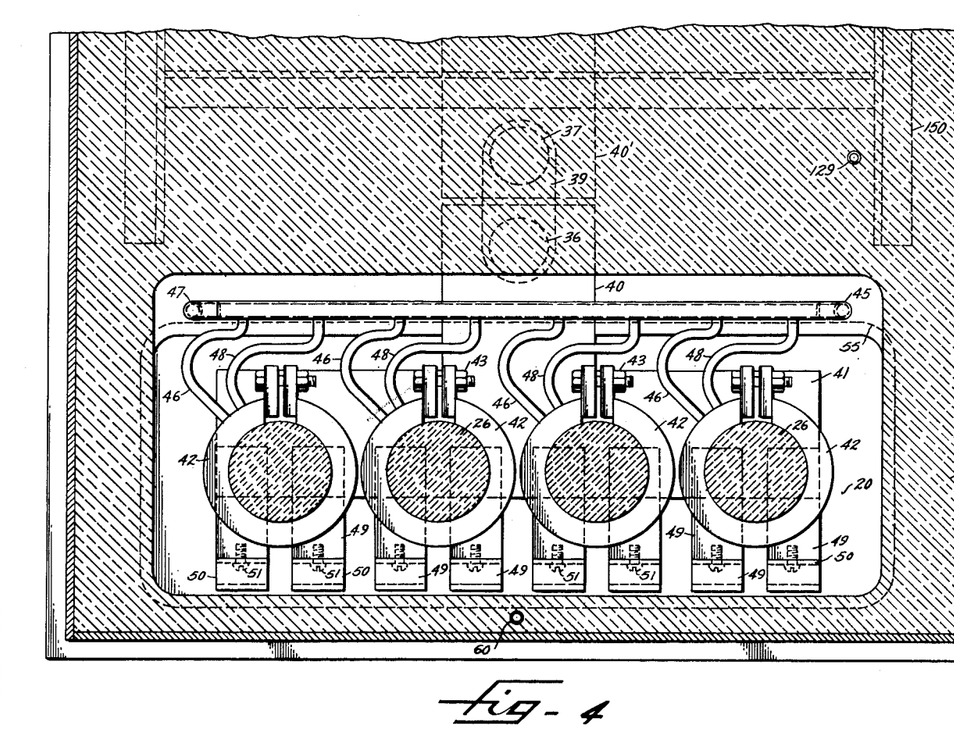
Fig. 4 is a view taken on line 4—4 of Fig. 3.
Figure 6:
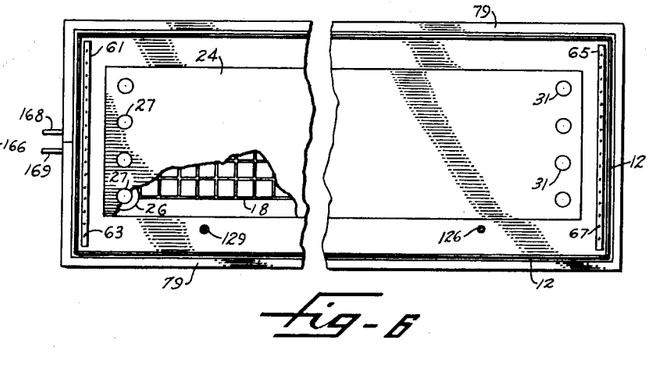
Fig. 6 is a view taken on line 6—6 of Fig. 1 with portions of the structure cut away to show its construction.

With reference to Fig. 3 of the drawing the apparatus comprises a lower body member 10 which includes a block 11 of hardened castable refractory material having a rigid metal shell 12, preferably of stainless steel, extending along its sides and a metal base 13 connected to shell 12. The upper face 15 of block 11 is provided with a recess 16 having a lower surface 17 provided with intersecting grooves 18 and the lower face 19 of block 11 is provided with spaced apart cavities 20 and 21 which extend the length of recess 16 beneath opposite sides thereof. A series of cylindrical openings 22 extend upwardly through block 11 from cavity 20 into recess 16 and similar openings 23 extend upwardly through block 11 from cavity 21 into recess 16. A solid electrical resistance heating element 24 is positioned in recess 16 and is prevented from contacting the walls of the recess by a layer of heat-resistant cloth material 25 such, for example, as Fiberfrax and Refrasil disposed therebetween. Positioned in each of openings 22 is an electrode 26 having a diameter slightly smaller than opening 22 to permit the passage of gas therealong for a purpose to be explained. The upper end 27 of each of electrodes 26 is reduced in diameter and threaded for engagement in a similarly threaded opening 28 in element 24 and the lower ends 29 of electrodes 26 extend into cavity 20. An electrode 30 similar to electrodes 26 is positioned in each of openings 23 electrodes 30 having a diameter slightly smaller than the diameter of openings 23 to permit passage of gas therealong for a purpose to be explained. The upper ends 31 of electrodes 30 are reduced in diameter and threaded for engagement in similarly threaded openings 32 in element 24 and the lower ends 33 of electrodes 30 extend into cavity 21. Heating element 24 and electrodes 26 and 30 are preferably composed of solid graphite and electrodes 26 and 30 are preferably of such size that the total cross sectional area of either electrodes 26 or electrodes 30 is equal to at least twice the cross sectional area of heating element 24. The upper surface 34 of heating element 24 is shown flat and arranged to support a flat honeycomb sandwich panel 35 in assembled position, however, surface 34 may be shaped as necessary to support panels of various shapes such as curved or tapered. A pair of electrical connectors 36 and 37 arranged for connection to a source of electrical current (not shown) are positioned in and extended through an opening in base 13 and are held in spaced apart positions and insulated from bottom 13 and from each other by a plate 38 of rigid dielectric material surrounding connectors 36 and 37 together with a layer of dielectric cloth material 39 such, for example, as Fiberfrax and Refrasil form a closure for the base opening (Figs. 3 and 4). Connector 36 is attached to a bar 40 composed of metal having a high electrical conductivity, which extends into cavity 20 and has an end section 41 extending the length of cavity 20 beneath electrodes 26. Each of electrodes 26 has a clamp 42 secured thereto adjacent lower end 29 by means of a bolt 43. Clamps 42 are provided with passages 44 extending therethrough one end of which is connected to an inlet pipe 45 extending into cavity 20 through bottom 13, by a flexible connection 46 and the other end is connected to an outlet pipe 47 extending from cavity 20, by a flexible connection 48 to permit a stream of coolant to pass through clamps 42. Each of clamps 42 is connected to end section 41 of bar 40 by a pair of electrical connectors 49 (see Fig. 4) each of which has one end 50 connected to clamp 42 by means of screws 51 and the other end 52 connected to end section 41 by means of screws 53. Connectors 49 are preferably composed of laminated metal having high electrical conductivity and shaped as shown in Fig. 3 of the drawing. The elements connecting electrodes 30 and connector 37 are identical to those connecting electrodes 26 to connector 36 and for clarity are indicated by the same reference numbers primed. Connector 37 is attached to a bar 40' similar to bar 40 and having an end section 41' extending the length of cavity 21 beneath electrodes 30. Each of electrodes 30 has a clamp 42' similar in all respects to clamp 42, secured thereto by a bolt 43'. Clamps 42' are provided with passages (not shown) similar to passages 44 in clamp 42, extending therethrough which are connected to inlet pipe 45' and outlet pipe 47' extending into cavity 21 through bottom 13 by means of flexible connections 46' and 48' to permit a stream of coolant to pass therethrough. Each of clamps 42' is connected to end section 41' by a pair of electrical connectors 49' similar to connectors 49, each connector having one end 50' secured to a clamp 42' by means of screws 51' and the other ends 52' secured to end section 41' by means of screws 53'. Base 13 is provided with an opening 54 under cavity 20 having a suitable removable closure 55 disposed thereover and an opening 56 under cavity 21 which has a similar closure 57. A pipe 58 passes through closure 55 and extends into cavity 20 and a similar pipe 59 passes through closure 57 into cavity 21 for a purpose to be explained. A pipe 60 extending upwardly through base 13 and block 11 adjacent one side thereof terminates in a pipe 61 contained in a groove 62 in surface 15 of block 11, pipe 61 being provided with spaced apart openings 63 (see Fig. 6) along its entire length. A pipe 64 similar to pipe 60 extends upwardly through base 13 and block 11 at the opposite side thereof which terminates in a pipe 65 contained in a groove 66 in surface 15 of block 11, pipe 63 being provided with spaced apart openings 67 along its entire length. Both of pipes 61 and 65 are provided with suitable end closures (not shown). An angle iron 68 secured to shell 12 and extending entirely around lower body member 10 is provided with spaced apart openings 69 each of which is adapted to receive a threaded bolt 70 which is adjustably secured therein by a pair of lock nuts 71. Secured to the upper end 72 of each of bolts 70 is a bar 73 positioned parallel to shell 12 and provided with spaced apart openings 74 (see Fig. 2) in each of which an upwardly projecting pin 75 is slidably contained. A small block 76 is secured to the upper end 77 of each of pins 75 and a spring 78 surrounding pins 75 between bar 73 and block 76 resiliently urges block 76 and pins 75 upwardly. A hollow tubular member 79 having a rectangular shape in section and extending around body member 10 is secured to and supported on blocks 76. Tubular member 79 is provided with an inlet 80 at one end 81 thereof and an outlet 82 at the other end 83 thereof (see Fig. 2) for a purpose to be explained.

Figure 5:
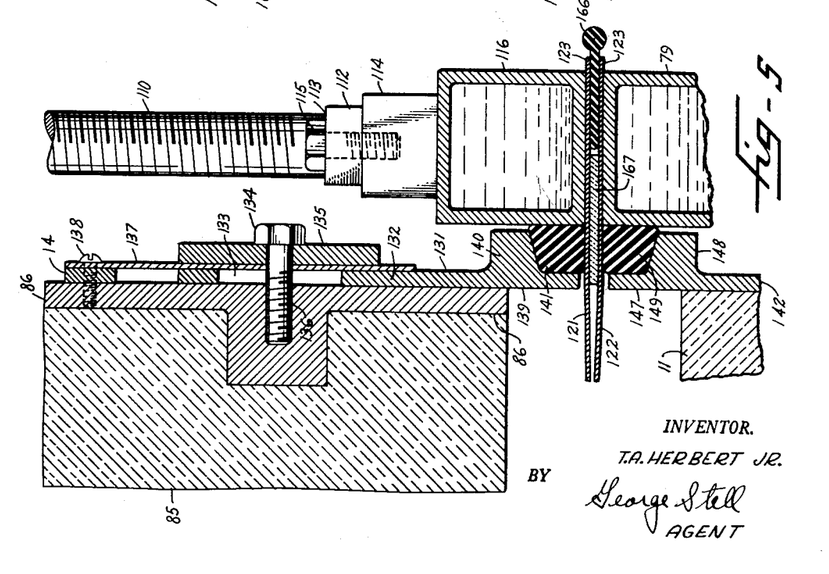
Fig. 5 is an enlarged view in section of part of the apparatus.
Figure 7:
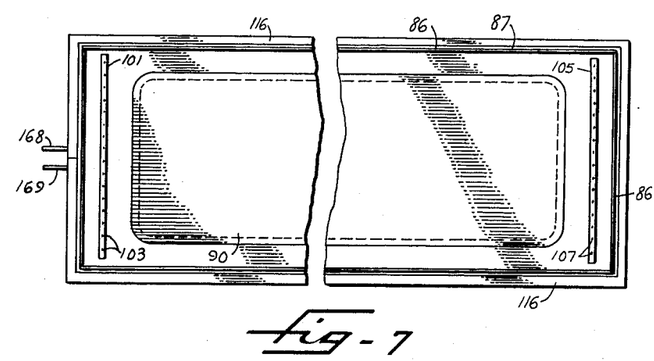
Fig. 7 is a view taken on line 7—7 of Fig. 1.
Figures 8, 9:
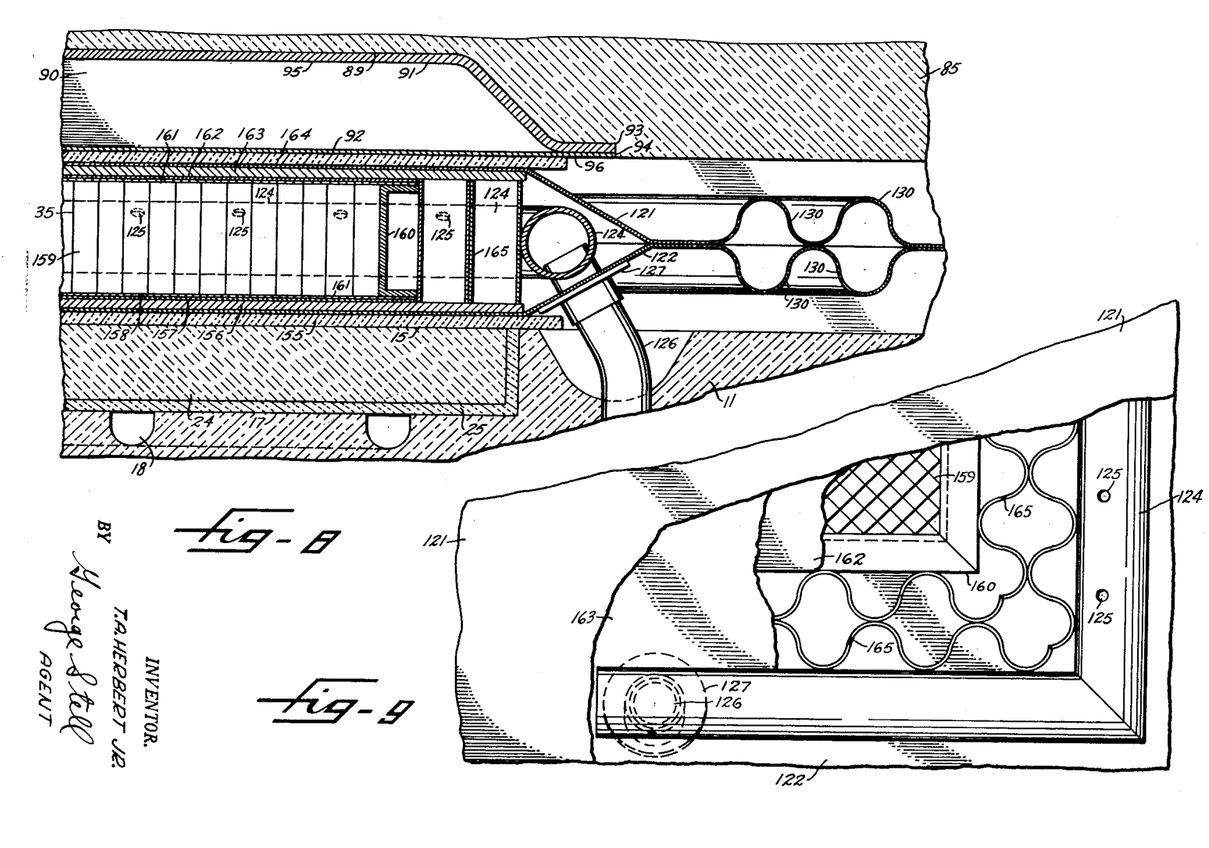
Fig. 8 is an enlarged sectional view of a portion of the apparatus and the sandwich panel to be brazed, illustrating the various elements used in the brazing operation
Fig. 9 is an enlarged top view of a part of the apparatus shown in Fig. 6 with portions cut away to show its construction.

An upper body member 84 comprising a block 85 of hardened castable material similar to that in block 11 and having the same size and shape as block 11, is provided with a metal shell 86 surrounding its sides which is connected to a metal plate 87 covering the upper surface thereof and an exposed lower surface 88 positioned over and spaced away from surface 15 of block 11. Upper body member 84 is supported over and movable toward and away from lower body member 10 in a manner and for a purpose to be described. Lower face 88 of block 85 is provided with a recess 89 in which a hollow metallic pressure pad 90 is contained which comprises an upper metal sheet 91 shaped to fit within recess 89 and a lower sheet 92 of thin relatively flexible metal having its edges 93 attached to the edges 94 of sheet 91. The lower surface 95 of sheet 91 and the lower surface 96 of sheet 92 are plated as with chromium and polished to a reflective surface for a purpose to be explained. Pressure pad 90 is held in recess 89 by pins 97 extending through plate 87 and block 85 and having their lower ends 98 secured to sheet 91 as by welding. A pipe 99 passing through plate 87 and block 85 is secured to sheet 91 and opens into the interior of pressure pad 90 for a purpose to be explained. A pipe 100 passes through plate 87 and block 85 adjacent one side thereof and is connected to a pipe 101 contained in a groove 102 in surface 88 of block 85, pipe 101 being provided with suitable end closures (not shown) and spaced apart openings 103 (see Fig. 7) along its entire length. A pipe 104 passes through plate 87 and block 85 adjacent the other side thereof which is connected to a pipe 105 contained in a groove 106 in surface 88 of block 85, pipe 105 being provided with end closures (not shown) and openings 107 (see Fig. 7) along its entire length. An angle iron 108, similar to angle iron 68, attached to shell 86 extends entirely around upper body member 84 and is provided with spaced apart openings 109 each of which is adapted to receive a threaded bolt 110 which is adjustably secured therein by a pair of lock nuts 111. A block 112 is secured to the lower end 113 of each of bolts 110 as by welding and a bar 114 secured to block 112 by means of bolts 115 (see Fig. 5). A hollow tubular member 116 similar to tubular member 79 extends around upper body member 84 in vertical alignment with member 79 and is attached to bars 114 for support. Tubular member 116 is provided with an inlet 117 adjacent one end 118 and an outlet 119 adjacent the other end 120 for a purpose to be explained. A pair of metal sheets 121 and 122 (see Figs. 3, 5 and 8) are positioned between opposing faces 88 and 15 of upper and lower body members 84 and 10 which extend along opposite sides of panel 35 and have converging edges 123 extending out between hollow tubular members 79 and 116. Disposed between sheets 121 and 122 and extending along one side of panel 35 is a pipe 124 provided with openings 125 (see Figs. 3, 8 and 9) to which a pipe 126 passing through a flanged opening 127 in sheet 122 is connected, pipe 126 extending through block 11 of lower body member 10. A pipe 128 provided with openings (not shown) similar to openings 125, extends along the opposite side of panel 35 between sheets 121 and 122 and is connected to a pipe 129 (see Fig. 1) extending through lower body member 10, in a manner similar to that in which pipe 126 is connected to pipe 124. Sheets 121 and 122 are both provided with curved portions 130 disposed opposite each other to permit thermal expansion and contraction thereof during a brazing operation without causing the sheets to move or shift positions.

Upper body member 84 is provided with sealing member 131 extending entirely around it which has a flat portion 132 provided with elongated openings 133 (see Fig. 5) through which bolts 134 provided with clamping bars 135 pass into threaded openings 136 in shell 86 to adjustably secure member 131 thereto. A thin plate 137 secured to shell 86 by screws 138 and provided with a spacer 14 extends along portion 132 to hold member 131 against shell 86 to facilitate adjustment in the position of member 131 when bolts 134 are loosened. The lower end 139 of member 131 is provided with an outwardly projecting portion 140 under which a flexible heat resistant gasket 141 formed of a suitable cloth material such, for example, as Fiberfrax and Refrasil is positioned. Lower body member 10 is provided with a sealing member 142 similar to member 131 which is adjustably secured to shell 12 in the same manner by a bolt 143 provided with a clamping bar 144 and a thin plate 145 similar in shape and purpose to plate 137 (see Fig. 3) is secured to shell 12 by screws 146. The upper end 147 of member 142 has an outwardly projecting portion 148 which is in engagement with a flexible heat resistant gasket 149 similar to gasket 141. When members 131 and 142 are properly positioned and upper body member 84 is positioned so that faces 15 and 88 are spaced apart a desired distance, gaskets 141 and 149 are pressed against sheets 121 and 122 and deformed to press outwardly against tubular members 79 and 116 in sealing contact therewith to form an effective seal between body members 10 and 84 on each side of sheets 121 and 122.

Figure 1:
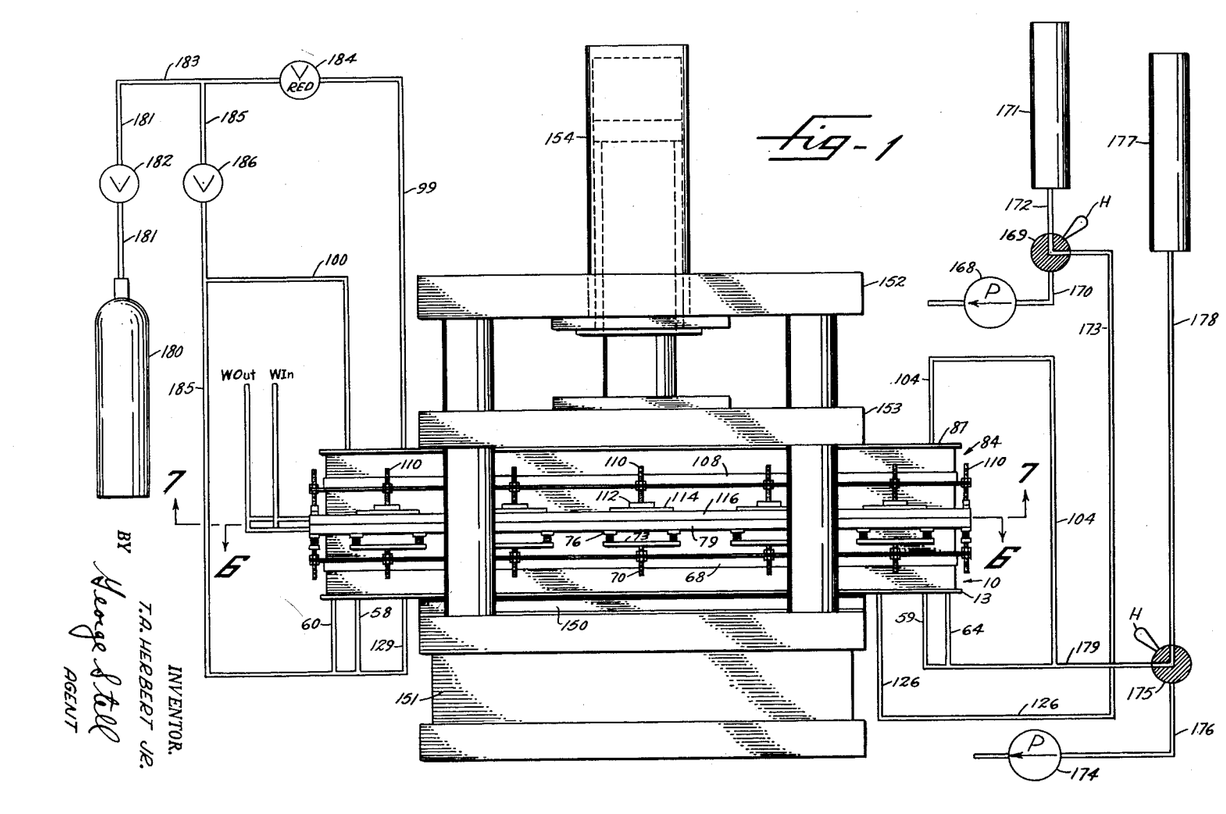
Fig. 1 is a front view of the apparatus mounted in a press in which the system for withdrawing air therefrom and directing an inert gas thereinto is shown schematically.

With reference to Fig. 1 of the drawing, lower body member 10 is shown supported in a stationary position on rails 150 secured to the bed 151 of a small press 152 of a known type. Press 152 is provided with a ram 153 connected to and movable vertically by a hydraulic cylinder and piston assembly 154 to which upper body member 84 is secured by a known means (not shown) directly over lower body member 10 for movement toward and away from member 10.

To prepare the apparatus and assemble the panel for brazing, upper body member 84 is raised and a sheet 155 of flexible heat resistant dielectric cloth material such, for example, as Fiberfrax and Refrasil is placed on surface 34 of heating element 24 (see Fig. 8) and sheet 122 is placed thereon. A relatively rigid metal sheet 156 is placed on sheet 122 and lower skin 157 of panel 35 is placed thereon. A thin sheet of brazing alloy 158 is placed on skin 157 and a metallic cellular core 159 is placed on the brazing alloy together with suitable panel edge members 160. A thin sheet of brazing alloy 161 is placed on core 159 and members 160 and upper skin 162 of panel 25 is placed thereon. A metal sheet 163 similar to sheet 156 is placed on skin 162 and metal sheet 121 is placed thereon over which a sheet 164 of flexible material similar to sheet 155 is placed. The area surrounding panel 35 between sheets 156 and 163 is provided with a supporting element 165 which is composed of thin corrugated metal strips extending between sheets 156 and 163 to prevent any bending or deformation thereof. Bolts 70 and 110 are adjusted in openings 69 and 109 to position tubular members 79 and 116 so that when upper body member 84 is properly positioned relative to lower body member 10 for the brazing operation, sheets 121 and 122 are pressed against tubular member 79 by tubular member 116 with sufficient force to compress springs 78 a small amount so that the sheets are tightly gripped between the tubular members. A resilient gasket 166 (see Fig. 5) is placed between sheets 121 and 122 adjacent edges 123 thereof to provide a seal against the passage of gas from between the sheets when the sheets are gripped between tubular members 79 and 116. A narrow strip 167 of flexible heat-resistant cloth material such, for example, as Fiberfrax and Refrasil is also placed between sheets 121 and 122 inwardly from gasket 166 to prevent gasket 166 from being damaged by the heat of the brazing operation. Sealing members 131 and 142 are also adjusted to a position in which gaskets 141 and 149 are pressed against 121 and 122 and deformed to press outwardly against tubular members 79 and 116 in sealing contact when upper body member 84 is lowered into position for the brazing operation. A water inlet pipe WIn (see Figs. 1 and 2) is connected to inlets 80 and 117 in ends 81 and 118 of tubular members 79 and 116 and a water outlet pipe WOut is connected to outlets 82 and 119 in ends 83 and 120 thereof to circulate cooling water through tubular members 79 and 116 to thereby cool edges 123 of sheets 121 and 122, thus providing gasket 166 with further protection from damage by the brazing heat. Inlets 80 and 117 and outlets 82 and 120 are arranged so that water flows in one direction through tubular member 79 and in the opposite direction through tubular member 116 so that edges 123 are cooled to a uniform temperature along their entire length. Upper body member 84 is positioned to perform the brazing operation by being lowered to a position directly over lower body member 10 and spaced therefrom a distance which permits lower sheet 92 of pressure pad 90 to be in firm contact with sheet 164 disposed on sheet 121. In this position tubular members 79 and 116 and sealing members 131 and 142 are positioned to perform their respective functions as above described.

With reference to Fig. 1 of the drawing the system for withdrawing air from within the panel and apparatus and directing an inert gas thereinto is shown comprising a first vacuum pump 168 connected to a valve 169 by a pipe 170. A stand pipe 171 is also connected to valve 169 by a pipe 172 and a pipe 173 connects pipe 126 to valve 169. Valve 169 is a known type which may be positioned by means of a handle H to connect pipe 173 to pipe 170 or to pipe 172. A second vacuum pump 174 similar to pump 168 is connected to a valve 175 similar to valve 169 and also provided with a handle H, by a pipe 176 and a second standpipe 177 similar to standpipe 171 is connected to valve 175 by a pipe 178. A pipe 179 is conected to valve 175 to which pipes 104, 64 and 59 are connected, and which may be connected to either pipe 176 or 178 through valve 175 by movement of handle H. A container 180 of pressurized inert gas which is heavier than air, such as argon, is provided with an outlet pipe 181 having a valve 182 therein. A pipe 183 connects pipe 99 to pipe 181 which is provided with a pressure regulating valve 184 with which the pressure of the gas directed through pipe 99 into pressure pad 90 is controlled for a purpose to be explained. A pipe 185 connected to pipe 183 and provided with a valve 186 is connected to pipes 58, 60, 100 and 129 to conduct gas therethrough.

To perform the brazing operation valves 169 and 175 are positioned to connect pipes 173 and 179 with pipes 170 and 176 and pumps 168 and 174 are actuated. Air is withdrawn from between sheets 121 and 122 into pipe 124 through openings 125 therein and out through pipes 126, 173 and 170 to pump 168 and exhausted thereby. Air is withdrawn from the area between sheet 121 and face 88 of upper body member 84 into pipe 105 through openings 107 therein and out through pipes 104, 179 and 176 to pump 174 and exhausted thereby. Air is withdrawn from the area between sheet 122 and face 15 of lower body member 10 into pipe 65 through openings 67 therein and out through pipes 64, 179 and 176 to pump 174 and exhausted thereby. Air is withdrawn from cavity 20 through opening 22 along electrode 26, through grooves 18 in lower surface 17 of recess 16, through opening 23 along electrode 30 into cavity 21 and out through pipes 59, 179 and 176 to pump 174 and exhausted thereby. As air is withdrawn from the various areas as above described valves 182 and 186 are opened to permit the inert gas to replace the air being withdrawn. Gas is conducted into the area between sheets 121 and 122 through pipes 181, 183, 185 and 129 to pipe 128 and out through the openings therein and into the area between sheet 121 and face 88 of upper body member 84 from pipe 185 through pipe 100 to pipe 101 and out through openings 103 therein. Gas is conducted into the area between sheet 122 and face 15 of lower body member 10 from pipe 185 through pipe 60 to pipe 61 and out through openings 63 therein and into cavity 20 from pipe 185 through pipe 58. The gas entering cavity 20 passes through opening 22 along electrode 26, through grooves 18 in lower surface 17 of recess 16, through opening 23 along electrode 30 and into cavity 21. The pressurized gas entering pressure pad 90 causes lower sheet 92 thereof to press downwardly thereby pressing panel 35 against element 24 with sufficient force to hold skins 157 and 162 in firm contact with the ends of core 159 during the brazing operation. The force with which sheet 92 presses against panel 35 may be varied by adjusting valve 184 to regulate the pressure of the gas admitted to pressure pad 90.

Pumps 168 and 174 are kept in operation until all of the air has been withdrawn from the entire structure and replaced with the inert gas. The pumps are then stopped and valves 169 and 175 are positioned to direct the gas from pipes 173 and 179 through pipes 172 and 178 into standpipes 171 and 177. The gas is permitted to flow until the standpipes are full of gas, the air having been ejected therefrom by the heavier gas entering at the bottom of the standpipes, and valve 186 is then closed to stop the flow of gas. Standpipes 171 and 177 are preferably at least six inches in diameter and ten to twelve feet in length so that the column of gas contained therein, since it is heavier than air, maintains a slight pressure on the gas contained in the various parts of the structure. In the event that any slight leakage develops in any part of the structure during the brazing operation the slightly pressurized gas escaping therethrough will prevent the entry of air thereinto which, if it reached the panel, would cause oxidation of the metal and render the completed panel unfit for its intended use.

Cooling water is directed to tubular members 79 and 116 and clamps 42 and 42' from a known source (not shown) in the manner previously described and electrical current is directed through heating element 24 through electrodes 26 and 30. Since the cross sectional area of both sets of electrodes 26 and 30 is much greater than the cross sectional area of element 24, as previously described, the conductive capacity of element 24 is substantially less than that of the electrodes so that the current passing therethrough causes element 24 to become hot and by proper regulation of the current the element may thus be heated to a desired temperature. The element is heated to a temperature sufficiently high to cause sheets 158 and 161 of brazing alloy to melt as the heat permeates panel 25. A relatively even heat is obtained throughout the panel by the heat passing therethrough being reflected back to the panel by the polished surfaces 95 and 96 of sheets 91 and 92 of pressure pad 90. The inert gas surrounding electrodes 26 and 30 tends to prevent overheating of the electrodes and also prevent oxidation of clamps 42 and 42' and the metal parts connected thereto by the high temperatures to which they are subjected. When panel 35 has been heated sufficiently to melt the brazing allow the flow of current through electrodes 26 and 30 is stopped and heating element 24 and panel 35 are allowed to cool to permit the brazing alloy to harden. To accelerate the cooling process pipe 58 may be disconnected from pipe 185 and pipe 59 disconnected from pipe 179 and a coolant gas, such as carbon dioxide, under pressure directed into pipe 58 to pass through cavity 20, opening 22, grooves 18, opening 23, cavity 21 and out of tube 59. When panel 35 has been sufficiently cooled valve 182 in line 181 is closed to stop the flow of gas to pressure pad 90 and upper body member 84 is raised by raising ram 153 to permit removal of panel 35 from between sheets 121 and 122.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In the construction of a metallic sandwich panel wherein the ends of a metallic cellular core are brazed to the opposing faces of two spaced apart metallic skins, means for holding said skins and core in assembled relationship and applying a brazing heat thereto, comprising: a lower body member of rigid heat-resistant material having an upper face provided with a recess; a rigid non-metallic temperature stable electrical resistance heating element disposed within said recess, said heating element having an upper face providing a temperature stable platform for supporting said skins and core in assembled relationship without distortion in response to heating of said element to brazing temperature of said skins and core; an upper body member of rigid heat-resistant material having a lower face provided with a recess, said lower face being disposed opposite said upper face of said lower body member; a hollow metallic member disposed within the recess in said lower face, said hollow member having a flexible lower face arranged to press the assembled skins and core together and against said heating element; and means for conducting electrical current to said heating element.

2. A structure as claimed in claim 1; in which the sides and lower surface of said lower body member and the sides and upper surface of said upper body member are provided with a rigid metallic covering.

3. In the construction of a metallic sandwich panel wherein the ends of a metallic cellular core are brazed to the opposing faces of two spaced apart metallic skins, means for holding said skins and core in assembled relationship and applying a brazing heat thereto, comprising: a lower body member of rigid heat-resistant material having an upper face provided with a recess; a solid electrical resistance heating element disposed within said recess, said heating element having an upper face adapted to support said skins and core in assembled relationship; an upper body member of rigid heat-resistant material having a lower face positioned opposite and spaced away from the upper face of said lower body member, said lower face being provided with a recess; a hollow metallic member disposed within the recess in said lower face, said hollow member being arranged and constructed to engage and press said assembled skins and core together and against said heating element; a pair of thin metal sheets disposed between the opposing faces of said upper and lower body members, said sheets having spaced apart central portions arranged to surround said assembled skins and core and converging edges extending outwardly beyond the sides of said upper and lower body members; means for pressing the extending edges of said sheets together; means for evacuating air from the area surrounding said skins and core between said sheets; means for conducting an inert gas into said evacuated area; and means for supplying electrical current to said heating element.

4. In the construction of a metallic sandwich panel wherein the ends of a metallic cellular core are brazed to the opposing faces of two spaced apart metallic skins, means for holding the skins and core in assembled relationship and applying a brazing heat thereto, comprising: a lower body member of rigid heat-resistant material having a rigid metallic covering along the sides and lower surface thereof and an exposed upper surface provided with a recess; a solid electrical resistance heating element disposed within said recess, said heating element having an upper surface arranged to support said skins and core in assembled relationship; an upper body member of rigid heat-resistant material having a rigid metallic covering along the sides and upper surface thereof and having an exposed lower surface disposed opposite and spaced away from the upper surface of said lower body member, said lower surface being provided with a recess; a hollow metallic member disposed within the recess in said lower face, said hollow member having a lower face arranged to engage and press said skins and core together and against said heating element; a pair of thin sheets of metal disposed between the opposing faces of said upper and lower body members, said sheets having spaced apart central portions arranged to surround said assembled skins and core and converging edges extending out beyond the sides of said body members; means connected to the sides of said upper and lower body members arranged to engage and press the extending edges of said sheets together; means connected to the sides of said upper and lower body members arranged and constructed to engage the extending portions of said sheets in sealing contact; means for evacuating air from the area surrounding said skins and core between said sheets; means for evacuating air from the area between the opposing faces of said upper and lower body members surrounding said metal sheets; means for directing an inert gas into said evacuated areas; and means for supplying electrical current to said heating element.

5. A structure as claimed in claim 4; in which said means for pressing the edges of said metal sheets together comprises a hollow member adjustably secured to the sides of said upper body member and extending therearound and a similar hollow member adjustably secured to the sides of said lower body member and extending therearound, said hollow members being arranged to grip the extending edges of said sheets therebetween and constructed to have a stream of coolant fluid passing therethrough.

6. In the construction of a metallic sandwich panel wherein the ends of a metallic cellular core are brazed to the opposing faces of two spaced apart metallic skins, means for holding said skins and core in assembled relationship and applying a brazing heat thereto, comprising: a lower body member of a rigid heat-resistant material having an upper face provided with a recess and a lower face provided with a plurality of spaced apart cavities, said body member being provided with a plurality of openings passing therethrough between said recess and cavities and said recess having a bottom surface provided with a plurality of intersecting grooves communicating with said openings; a rigid metal covering disposed along the sides and lower surface of said body member; a solid electrical resistance heating element disposed within said recess, said heating element having an upper face adapted to support said skins and core in assembled relationship; a plurality of rigid electrodes having a diameter smaller than the diameter of said openings disposed within said openings, said electrodes having their upper ends connected to said heating element and their lower ends extending into said cavities; means for connecting the lower ends of said electrodes to a source of electrical current; an upper body member of rigid heat-resistant material having a rigid metal covering extending along the sides and upper surface thereof and an exposed lower face provided with a recess, said lower face being disposed opposite said upper face of said lower body member and spaced apart therefrom; a hollow metal member disposed within the recess in said lower face, said hollow member having a flexible lower face adapted to press said assembled skins and core together and against said heating element; and means for directing fluid under pressure into said hollow metal member.

7. A structure as claimed in claim 6; in which said heating element and said electrodes are composed of solid graphite and said heating element is surrounded by a thin layer of flexible dielectric material.

8. In the construction of a metallic sandwich panel wherein the ends of a metallic cellular core are brazed to the opposing faces of two spaced apart metallic skins, means for holding said skins and core in assembled relationship and applying a brazing heat thereto, comprising: a lower body member of rigid refractory material having an upper face provided with a recess and a lower face provided with two spaced apart cavities, said body member being provided with a plurality of openings passing therethrough between said cavities and said recess; a rigid metal covering disposed along the sides and lower surface of said lower body member; a solid electrical resistance heating element disposed within said recess, said heating element having an upper face adapted to support said skins and core in assembled relationship; a plurality of rigid electrodes disposed within said openings, said electrodes having their upper ends connected to said heating element and their lower ends extending into said cavities; means for connecting the lower ends of said electrodes to a source of electrical current; an upper body member of rigid refractory material having a lower face positioned over the upper face of said lower body member and spaced away therefrom, said lower face being provided with a recess; a rigid metal covering disposed along the sides and upper surface of said upper body member; a hollow metal member disposed within the recess in said lower face, said hollow member having a flexible lower face adapted to press said assembled skins and core together and against said heating element; a pair of thin metal sheets disposed between the opposing faces of said upper and lower body members, said sheets having spaced apart central sections adapted to envelop said assembled skins and core and converging edges extending out beyond the sides of body members; means connected to the outer walls of said upper and lower body members adapted to engage and press the extending portions of said sheets together; means connected to the sides of said body members arranged to engage said sheets in sealing contact to provide a seal around the area between the opposing faces thereof; means for evacuating air from around said skins and core between said metal sheets and from the area between the opposing faces of said upper and lower body members; means for directing a non-oxidizing gas into said evacuated area; and means for maintaining pressure on said gas during the brazing operation.

9. A structure as claimed in claim 8 in which a means is provided for evacuating air from within said cavities and openings and circulating an inert gas therethrough.

10. A structure as claimed in claim 8; in which said hollow metal member is arranged to receive a pressurized gas to thereby cause the flexible lower face thereof to press said assembled skins and core against said heating element.

11. A structure as claimed in claim 8; in which said heating element and said electrodes are composed of graphite and the cross sectional area of said electrodes is equal to at least twice the cross sectional area of said heating element.

12. In the construction of a metallic sandwich panel wherein the ends of a metallic cellular core are brazed to the opposing faces of two spaced apart metallic skins, means for holding said skins and core in assembled relationship and applying a brazing heat thereto, comprising: a lower body member of rigid heat resistant material having an upper face provided with a recess; a solid electrical resistance heating element disposed within said recess, said heating element having an upper face arranged to support said skins and core in assembled relationship; means for conducting electrical current to said heating element; an upper body member of rigid heat-resistant material having a lower face positioned above and spaced away from the upper face of said lower body member, said lower face being provided with a cavity; a hollow metal member disposed within the recess in said lower face, said hollow member having a lower surface adapted to engage and press against said assembled skins and core; a pair of thin metal sheets disposed between the opposing faces of said upper and lower body members, said sheets having spaced apart central sections arranged to surround said skins and core and converging edges extending out beyond the sides of said upper and lower body members; means associated with said upper and lower body members arranged to engage and press the extending edges of said sheets together; means connected to said upper and lower body members arranged to engage said sheets in sealing contact to provide a seal around the areas between said sheets and the opposing faces of said upper and lower body members; a first set of conduits communicating with the area between said metal sheets around said skins and core and the areas between said metal sheets and the faces of said upper and lower body members; means connected to said conduits for evacuating air from said areas; a second set of conduits connected to source of pressurized inert gas which is heavier than air and communicating with said evacuated areas, said conduits being arranged to conduct said gas into said evacuated areas and through said areas into said first set of conduits; a standpipe connected to said first set of conduits and arranged to receive the pressurized gas passing through said first set of conduits, said standpipe extending a substantial distance above said upper and lower body members so that upon stopping the flow of pressurized gas through said second set of conduits the weight of the gas contained in said standpipe maintains a constant pressure on the gas contained in said evacuated areas.

13. A structure as claimed in claim 12; in which two standpipes are connected to said first set of conduits, said standpipes being arranged and constructed so that the weight of the gas contained in one standpipe maintains a pressure on the gas surrounding said skins and core between said sheets and the weight of the gas contained in the other standpipe maintains a pressure on the gas contained in the areas surrounding said sheets.

14. In the construction of a metallic sandwich structure wherein the ends of a metallic cellular core are brazed to the opposing faces of two spaced apart metallic skins, means for holding said skins and core in assembled relationship and applying brazing heat thereto, comprising: a lower body member of rigid heat-resistant material having an upper face provided with a recess; a block of graphite disposed within said recess, said block having an upper surface arranged to support said skins and core in assembled relationship and in heat conducting engagement therewith; an upper body member of rigid heat resistant material having a lower face positioned opposite the upper face of said lower body member, said lower face being provided with a recess; means disposed within the recess in said lower face arranged and constructed to conform to the shape of said skins and core and to press said skins and core together and against said block; flexible dielectric brazing heat resistant means interposed yieldably between said upper surface of said block and said assembly of skins and core to electrically insulate the same from each other while passing heat by conduction uniformly from the surface area of said block surface to said assembly; and means for heating said graphite block to a temperature sufficient to provide said brazing heat for said skins and core.

15. In the construction of a metallic sandwich structure wherein the ends of a metallic cellular core are brazed to the opposing faces of two spaced apart metallic skins, means for holding said skins and core in assembled relationship and applying a brazing heat thereto, comprising: a pair of body members formed of rigid heat-resistant material, means for supporting said members in mutually spaced apart relation, an electrical heating element comprising a graphite block interposed between said members and secured to one of said members for supporting said skins and core in assembled relationship, said block having a surface disposed in heat conducting engagement with said assembled skins and core and conforming to the outer face of one of said skins, flexible dielectric brazing heat resistant means interposed yieldably between said one of the skins and said block surface for electrically insulating the same from each other while providing for uniform transfer of heat by conduction from the surface area of said block surface to said one of the skins, and means interposed between said members and conforming to the outer face of the other of said skins, for pressing said skins and core together and against said surface of the block.

16. Apparatus for brazing the ends of a metallic cellular core to the opposing faces of two spaced apart metallic skins to produce a honeycomb sandwich panel comprising, means including an electrical heating element for holding said skins and core in assembled relationship and applying brazing heat thereto, said heating element comprising a block of graphite for supporting said skins and core in assembled relationship and in heat conducting engagement therewith, said block of graphite having a surface coextensive with and conforming to the outer face of one of said skins and providing a temperature stable platform for said skins and core to prevent distortion thereof in response to heating of said element to brazing temperature of the skins and core, and a thin flexible sheet of brazing heat resistant dielectric material interposed yieldably between said block of graphite and said one of the skins for electrically insulating the same from each other while providing for transfer of heat uniformly by conduction from said element to said skins and core.

17. Apparatus for brazing the ends of a metallic cellular core to the opposing faces of two spaced apart metallic skins to produce a honeycomb sandwich panel comprising, graphite means including an electrical heating element formed of graphite for holding and supporting said skins and core in assembled relationship and for applying brazing heat thereto, said graphite means having a panel supporting and heating surface for supporting the panel in heat conducting engagement therewith uniformly over a surface at lease coextensive with the panel area to be brazed, said supporting and heating surface conforming to the outer face of one of said skins and providing a temperature stable platform for said skins and core to prevent distortion thereof in response to heating of said element to brazing temperature of the skins and core, and a thin flexible sheet of brazing heat resistant dielectric material interposed yieldably between said graphite element and said one of the skins for electrically insulating the same from each other while providing for transfer of heat by conduction from said element to said skins and core.

18. The method of brazing the ends of a metallic cellular core to the opposing faces of two spaced apart metallic skins to produce a honeycomb sandwich panel comprising, the steps of electrically generating heat at the brazing temperature of said skins and core and uniformly over and within the surface area of a panel supporting and heating surface disposed in heat conducting engagement with a panel to be brazed and adjacent to and coextensive with the outer face of one of said skins, and transferring said generated heat by conduction uniformly from said surface area to said skins and core to braze the same together, said heat being transferred by conduction through a flexible dielectric brazing heat resistant medium interposed yieldably between said surface area and said one of said skins.

19. The method of brazing the ends of a metallic cellular core to the opposing faces of two spaced apart metallic skins to produce a honeycomb sandwich panel comprising, the steps of electrically generating heat at the brazing temperature of said skins and core and uniformly over and within the surface area of a panel supporting and heating surface disposed in heat conducting engagement with a panel to be brazed and adjacent to and coextensive with the outer face of one of said skins, generating said heat within a heat resistant enclosing medium of low thermal conductivity surrounding said panel, and transferring said generated heat by conduction uniformly from said surface area to said skins and core to braze the same together, said heat being transferred by conduction through a flexible dielectric brazing heat resistant medium interposed yieldably between said surface area and said one of said skins.

20. The method of brazing the ends of a metallic cellular core to the opposing faces of two spaced apart metallic skins to produce a honeycomb sandwich panel comprising, the steps of electrically generating heat at the brazing temperature of said skins and core and uniformly over and within the surface area of a panel supporting and heating surface disposed in heat conducting engagement with a panel to be brazed and adjacent to and coextensive with the outer face of one of said skins, generating said heat within a heat resistant enclosing medium of low thermal conductivity surrounding said panel, withdrawing the surrounding air from said panel and replacing the same with inert gas, and transferring said generated heat by conduction uniformly from said surface area to said skins and core to braze the same together, said heat being transferred by conduction through a flexible dielectric brazing heat resistant medium interposed yieldably between said surface area and said one of said skins.

21. The method of brazing the ends of a metallic cellular core to the opposing faces of two spaced apart metallic skins to produce a honeycomb sandwich panel comprising, the steps of interposing sheets of brazing alloy respectively between said skins and said ends of the core adjacent thereto, electrically generating heat at the brazing temperature of said skins and core and uniformly over and within the surface area of a panel supporting and heating surface disposed in heat conducting engagement with a panel to be brazed and adjacent to and coextensive with the outer face of one of said skins, generating said heat within a heat resistant enclosing medium of low thermal conductivity surrounding said panel, withdrawing the surrounding air from said panel and replacing the same with inert gas, and transferring said generated heat by conduction uniformly from said surface area to said skins and core to braze the same together, said heat being transferred by conduction through a flexible dielectric brazing heat resistant medium interposed yieldably between said surface area and said one of said skins.

22. The method of producing a honeycomb sandwich panel by brazing the ends of a metallic cellular core to the opposing faces of two spaced apart metallic skins comprising, the steps of interposing sheets of brazing alloy respectively between said skins and said ends of the core adjacent thereto, electrically generating heat uniformly over and within the surface area of a panel supporting and heating surface disposed in heat conducting engagement with a panel to be brazed and adjacent to and coextensive with the outer face of one of said skins, transferring said generated heat by conduction uniformly from said surface area to said skins and core through a flexible dielectric brazing heat resistant medium interposed yieldably between said surface area and said one of the skins, electrically increasing said heat to the brazing temperature of said skins and core while maintaining said surface area free of distortion thereby to provide a temperature stable platform for said panel, and cooling said panel by withdrawing heat therefrom by conduction to a second surface area spaced from said first mentioned surface area and coextensive therewith.

23. The furnaceless method of brazing the ends of a metallic cellular core to the opposing faces of two spaced apart metallic skins to produce a honeycomb sandwich panel comprising, the steps of locally generating heat electrically at the brazing temperature of said skins and core and uniformly over and within the immediate vicinity of one of said skins by passing electrical current through an electrical conductor disposed yieldably in heat conducting engagement with said panel and having a surface area disposed substantially in face adjacency to and coextensively with the outer face of said one of said skins, and transferring said generated heat by conduction from said surface area to said skins and core through a flexible dielectric brazing heat resistant medium disposed coextensively with said surface area and interposed yieldably between said one of the skins and said conductor thereby to pass said generated heat uniformly by conduction from said surface area to said skins and core to braze the same together.

24. The method as claimed in claim 23 and comprising the additional step of uniformly reflecting back a portion of said transferred heat into the panel from an area adjacent to and coextensive with the outer surface of the other of said skins thereby to provide an even heat throughout the panel.

25. The furnaceless method of producing a honeycomb sandwich panel by brazing the ends of a metallic cellular core to the opposing faces of two spaced apart metallic skins comprising, the steps of interposing sheets of brazing alloy respectively between said skins and said ends of the core adjacent thereto, locally generating heat electrically uniformly over and within the immediate vicinity of one of said skins by passing electrical current through an electrical conductor disposed yieldably in heat conducting engagement with said panel and having a surface area disposed substantially in face adjacency to and coextensively with the outer face of said one of said skins, transferring said generated heat by conduction from said surface area to said skins and core through a flexible dielectric brazing heat resistant medium disposed coextensively with said surface area and interposed yieldably between said one of the skins and said conductor thereby to pass said generated heat uniformly by conduction from said surface area to said skins and core, and increasing said current thereby to electrically increase said heat to the brazing temperature of said skins and core while maintaining said surface area free of distortion thereby to provide a temperature stable platform for said panel.

26. The method as in claim 25 and comprising the additional step of diffusing said heat uniformly over said surface area as the same is generated by said conductor.

References Cited in the file of this patent
UNITED STATES PATENTS

| | | |
|---|---|---|
| 693,803 | Norton | Feb. 18, 1902 |
| 853,351 | Fulton | May 14, 1907 |
| 1,096,475 | Van Glahn | May 12, 1914 |
| 1,533,269 | Reid | Apr. 14, 1925 |
| 2,299,776 | Weightman | Oct. 27, 1942 |
| 2,366,164 | Weick et al. | Jan. 2, 1945 |
| 2,489,643 | Hunter | Nov. 29, 1949 |
| 2,509,439 | Langer | May 30, 1950 |
| 2,551,244 | Clark | May 1, 1951 |
| 2,926,761 | Herbert | Mar. 1, 1960 |